(12) United States Patent
Avakian et al.

(10) Patent No.: US 7,858,678 B2
(45) Date of Patent: Dec. 28, 2010

(54) PHOSPHONIUM FLOW ENHANCERS FOR BLENDS OF POLYCARBONATE AND POLYESTER

(75) Inventors: Roger W Avakian, Aurora, OH (US); John Papadopulos, Canton, OH (US)

(73) Assignee: PolyOne Corporation, Avon Lake, OH (US)

( * ) Notice: Subject to any disclaimer, the term of this patent is extended or adjusted under 35 U.S.C. 154(b) by 235 days.

(21) Appl. No.: 12/302,007

(22) PCT Filed: May 31, 2007

(86) PCT No.: PCT/US2007/070178

§ 371 (c)(1),
(2), (4) Date: Nov. 21, 2008

(87) PCT Pub. No.: WO2007/143525

PCT Pub. Date: Dec. 13, 2007

(65) Prior Publication Data

US 2010/0222476 A1    Sep. 2, 2010

Related U.S. Application Data

(60) Provisional application No. 60/803,893, filed on Jun. 5, 2006.

(51) Int. Cl.
    C08K 5/49 (2006.01)
    C08K 5/53 (2006.01)
    C08K 5/50 (2006.01)
    C08K 5/51 (2006.01)
    C08L 67/02 (2006.01)
    C08G 63/692 (2006.01)
    C08G 63/91 (2006.01)

(52) U.S. Cl. .................. 523/500; 523/506; 524/115; 524/133; 524/136; 524/139; 524/154; 525/419; 525/466

(58) Field of Classification Search ................ 523/500, 523/506; 524/115, 133, 136, 139, 154; 525/419, 525/466

See application file for complete search history.

(56) References Cited

U.S. PATENT DOCUMENTS

| | | | |
|---|---|---|---|
| 3,864,428 A | 2/1975 | Nakamura et al. | |
| 4,257,937 A | 3/1981 | Cohen et al. | |
| 4,482,672 A | 11/1984 | Neuray et al. | |
| 4,539,370 A | 9/1985 | Nouvertne et al. | |
| 6,599,966 B2 | 7/2003 | Penning et al. | |
| 2006/0100326 A1* | 5/2006 | Kawakabe et al. | 524/115 |

FOREIGN PATENT DOCUMENTS

WO    WO 2004056917 A1 *  7/2004

OTHER PUBLICATIONS

Abstract for KR20020084503 (Esp@cenet), Nov. 9, 2002.
Abstract for KR20030037354 (Esp@cenet), May 14, 2003.
Product Literature for CYPHOS IL Phosphonium Salt Kit (2003).
Product Literature for CYPHOS IL 101 Phosphonium Salt (2005).
Product Literature for CYPHOS IL 102 Phosphonium Salt (2005).
Product Literature for CYPHOS IL 103 Phosphonium Salt (2005).
Product Literature for CYPHOS IL 104 Phosphonium Salt (2005).
Product Literature for CYPHOS IL 105 Phosphonium Salt (2005).
Product Literature for CYPHOS IL 106 Phosphonium Salt (2005).
Product Literature for CYPHOS IL 109 Phosphonium Salt (2005).
Product Literature for CYPHOS IL 110 Phosphonium Salt (2005).
Product Literature for CYPHOS IL 111 Phosphonium Salt (2005).

* cited by examiner

Primary Examiner—Mark Eashoo
Assistant Examiner—Michael Pepitone
(74) Attorney, Agent, or Firm—John H. Hornickel

(57) ABSTRACT

A thermoplastic polymer blend is disclosed comprising a polyester, a polycarbonate, and a minor amount of a flow enhancer selected from non-sulfonated phosphonium salts. Optionally, impact modifiers and other conventional additives are included.

16 Claims, No Drawings

PHOSPHONIUM FLOW ENHANCERS FOR BLENDS OF POLYCARBONATE AND POLYESTER

CLAIM OF PRIORITY

This application is a 35 U.S.C. §371 U.S. National Stage Application of International Application No. PCT/US2007/070178, filed on May 31, 2007, claiming priority from U.S. Provisional Application Ser. No. 60/803,893 and filed on Jun. 5, 2006, which is incorporated by reference.

FIELD OF THE INVENTION

This invention relates the use of phosphonium compounds to enhance processing of a blend of polycarbonate and polyester.

BACKGROUND OF THE INVENTION

Blends of polycarbonate (PC) and polyester (P*T where * refers to an olefin such as ethylene or butylene) are well known as engineered polymeric materials. Often PC/P*T blends are impact modified. For example, European Patent Publication EP1207172A2 discloses an improved impact modifier for blends of polyester with other polymers, including polycarbonate, wherein the impact modifier itself is a blend of a core/shell additive and a linear copolymer of olefin, alkyl acrylate, and glycidyl methacrylate monomers.

PC/P*T blends can also benefit from flow enhancers to improve processing properties of the blend. U.S. Pat. No. 6,599,966 (Penning et al.) discloses polycarbonate-polyester compositions with enhanced flow. The flow enhancing additives are selected from lignin and phosphonium sulfonate.

SUMMARY OF THE INVENTION

What is needed is better flow enhancement for blends of polycarbonate (PC) and polyester (P*T), especially polyethylene terephthalate (PET) and/or polybutylene terephthalate (PBT). There is a need to produce blends which have good impact and flow properties, smooth surface finishes, weatherability, scratch resistance, solvent resistance, and a balance of flexural modulus, heat distortion temperature, and impact properties.

One aspect of the present invention is a thermoplastic polymer blend, comprising (a) a polyester; (b) a polycarbonate; and (c) a flow enhancer selected from the group consisting of phosphonium phosphinates; phosphonium bromides; phosphonium chlorides; phosphonium decanoates; phosphonium dicyanamides; phosphonium hexafluorophosphates; and phosphonium tetrafluoroborates.

Another aspect of the present invention is an extruded or molded article made from the polymer blend described above.

The present invention also optional uses, in a minor amount, one or more impact modifiers.

Features and advantages will be revealed in the discussion of the embodiments below.

EMBODIMENTS OF THE INVENTION

Thermoplastic Polymers to be Flow Enhanced

The thermoplastic polymers can be a blend of polycarbonate (PC) and polyester (P*T) (such as polyethylene terephthalate (PET), polypropylene terephthalate (PPT), polybutylene terephthalate (PBT), poly(ethylene-2,6-napthalate) (PEN), polypropylene napthalate (PPN), poly(1,4-cyclohexanedimethanol terephthalate) (PCT), polyethylene naphthalate dibenzoate (PENDB), and polybutylene naphthalate (PBN)).

Additionally, one can add to the blend any of a number of polymers of the polycondensate type including without limitation, and polyester-type of liquid crystalline polymers (LCP).

Of these possibilities, a blend of polycarbonate and a polyester is desirable with a blend of PC with either PET or PBT being preferred.

The amount of thermoplastic polymer in the blend can range from about 50 to about 99, and preferably from about 60 to about 90 weight percent of the blend.

The relative contribution of the polycarbonate to the blend ranges from about 15 to about 85 weight percent, and preferably from about 20 to about 70 weight percent of the blend.

The relative contribution of the polyester to the blend ranges from about 15 to about 85 weight percent, and preferably from about 20 to about 70 weight percent of the blend.

Flow Enhancer(s)

Unlike the teachings of U.S. Pat. No. 6,599,966 (Penning et al.), the present invention does not use phosphonium sulfonates, because of potential deleterious effects on impact and modulus properties at higher molding temperatures.

The present invention uses as flow enhancers the following phosphonium salts: phosphonium phosphinates; phosphonium bromides; phosphonium chlorides; phosphonium decanoates; phosphonium dicyanamides; phosphonium hexafluorophosphates; and phosphonium tetrafluoroborates. Commercially available sources of such flow enhancers are phosphonium liquids of the brands Cyphos IL 104, Cyphos IL 102, Cyphos IL 101, Cyphos IL 103, Cyphos IL 105, Cyphos IL 110, Cyphos IL 111, respectively, all from Cytec Industries, Inc.

Of these phosphonium salts, Cyphos IL 104, 111, 101, and 103 phosphonium phosphinates are preferred.

Cyphos IL 104 phosphonium liquid is a slightly viscous room temperature ionic liquid, less dense than water. The phosphonium phosphinate (trihexyl(tetradecyl)phosphonium bis 2,4,4-trimethylpentylphosphinate) has CAS Number 465527-58-6 and the following chemical structure:

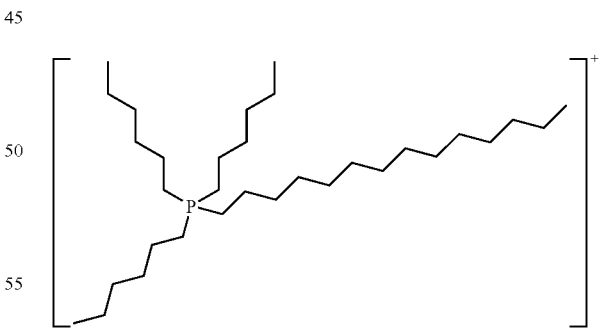

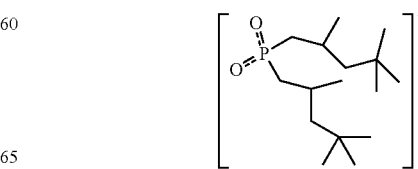

Cyphos IL 111 phosphonium tetraborate salt is a low melting point solid. Its complete chemical name is tetradecyl(trihexyl)phosphonium tetrafluoroborate and has a C.A.S Number of 374683-55-3.

The structure of Cyphos IL 111 is

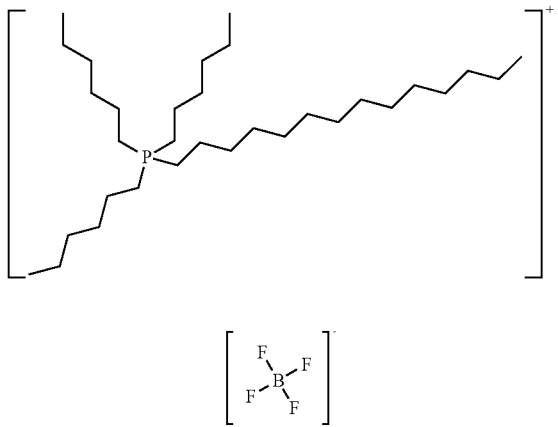

Cyphos IL 101 phosphonium chloride salt is a slightly viscous room temperature ionic liquid. Its complete chemical name is tetradecyl(trihexyl)phosphonium chloride and has a C.A.S, Number of 258864-54-9. Its chemical structure is the same as Cyphos IL 111, except that the tetraborate anion is replaced with a chloride anion Cl$^-$.

Cyphos IL 103 phosphonium chloride salt is a slightly viscous room temperature ionic liquid. Its complete chemical name is tetradecyl(trihexyl)phosphonium decanoate and has a C.A.S, Number of 465527-65-5. Its chemical structure is

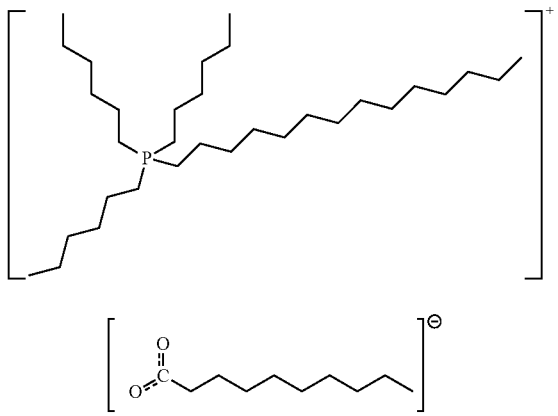

The amount of phosphonium flow enhancer in the total compound is only a minor amount and can range from about 0.1 to about 4 weight percent, and preferably from about 0.05 to about 1.5 weight percent.

Optional Impact Modifier(s)

Impact modifiers are optional, but preferred for use in the present invention. Any impact modifier that is conventionally employed as an impact modifiers for PC/P*T blends is useful in the present invention. Non-limiting examples include acrylic core-shell impact modifiers such as the KM branded series from Rohm & Haas; methacrylate/butadiene/styrene core-shell impact modifiers such as the Clearstrength branded series from Arkema, Inc.; ethylene/n-butyl acrylate/glycidyl methacrylate terpolymers such as the Elvaloy branded series from DuPont; n-octyl acrylate rubber/polymethylmethacrylate core-shell impact modifier commercially available as "D-400" also from Arkema; an impact modifier that is a linear terpolymer of (a) ethylene, (b) a lower alkyl acrylate and (c) a monomer which contains a heterocycle containing one oxygen atom as the hetero-atom, such as "Lotader AX 8900" brand impact modifier also from Arkema; a styrene-butadiene-methacrylate terpolymer also from Arkema as disclosed in PCT Patent Publication WO 2005/035666 incorporated by reference herein; a thermoplastic vulcanizate such as OnFlex™ V from PolyOne Corporation as disclosed in PCT Patent Publication WO 2005/071012 incorporated by reference herein; and mixtures of two of more of such impact modifiers listed above.

Such impact modifier(s) can be included in the blend of the present invention in an amount from about 0 to about 10, and preferably from about 0 to about 7. Most preferably, the amount is about 1 to about 5 percent by weight of the blend. Each impact modifier can be in powder, flake, or pellet form. They can be blended together into a concentrate or mixed with the thermoplastic polymers during melt processing in preparation for direct molding or pelletization for later molding.

Other Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; residual catalyst deactivators; and combinations of them.

Such optional additives can be included in the blend of the present invention in an amount from about 0 to about 40, and preferably from about 0.1 to about 30 weight percent. Most preferably, the amount is about −0.5 to about 10 weight percent of the blend.

Method of Processing Blends

The blend of the present invention can be prepared by any method which makes it possible to produce a thoroughly mixed blend containing the polycarbonate, the polyester, and the flow enhancer, along with any optional impact modifiers described above, and other optional additives, if any. It is possible, for example, to dry-mix the ingredients constituting the compound, then to extrude the resulting mixture and to reduce the extrudate to pellets.

As an example, extrusion can be carried out in a suitable extruder, such as a Werner-Pfleiderer co-rotating twin screw extruder. The extruder should be capable of screw speeds ranging from about 10 to about 2000 rpm, preferably from about 50 rpm to 1500 rpm. The temperature profile from the barrel number two to the die should range from about 170° C.

to about 350° C., and preferably from about 220° C. to about 270° C. so as to extrude at the processing temperature of the components of the desired compound. The extruder can be fed separately with the ingredients of the blend or together.

The selected temperature range should be from about 200° C. to about 260° C. for a PC/PBT based blend or a PC/PET based blend. The extrudate can be pelletized or directed into a profile die. If pelletized, the pellets can then be converted to an article by injection molding, compression molding, blow molding or other techniques known to those skilled in the art.

Preferably, one can introduce the polycarbonate and the polyester in split feed streams in two different ports of the extruder (main throat and down stream locations) with the use of both atmospheric vents and vacuum vents as preferred by those skilled in the art. High specific energy input is desirable to reduce the size of the impact modifier particles and to encourage uniform dispersion in the thermoplastic polymers. One can use a temperature profile of between 200 and 260° C., depending on the number and type of optional additives also included in the extruded blend. It is optional to dry the components prior to compounding, depending on the performance properties of final product.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness of the Invention

Impact-modified thermoplastic polymer blends of the present invention are useful for transportation-related molded items (e.g., crash helmets and parts for vehicles such as bumpers and fenders); electrical equipment when flame retardants or reinforcing fillers are also added (e.g., plugs, connectors, boxes, and switches); and consumer appliance housings and containers (e.g., kitchen appliance housings and shells, and consumer electronics housings and cases).

Further embodiments of the invention are described in the following Examples.

EXAMPLES

Table 1 shows the list of ingredients used to make Examples 1-8 and Comparative Example A.

TABLE 1

| Ingredient Name | Purpose | Brand Name | Generic Name | Source |
|---|---|---|---|---|
| Polycarbonate | Matrix | Calibre 200-10 | Polycarbonate | Dow |
| PBT | Matrix | Novaduran 5020 | Polybutylene Terephthalate | Mitsui |
| Acrylic Core Shell IM | Impact Modifier | D400 | Butyl Acrylate Core Shell IM | Arkema |
| Ultranox 641 | Antioxidant | Ultranox 641 | 2,4,6 tri-t-butylphenyl-2-butyl-2-ethyl-1,3-propanediol phosphite | Chemtura |
| Irganox 1010 | Antioxidant | Irganox 1010 | Pentaerythritol tetrakis (3-(3',5'-di-tert-butyl-4'-hydroxyphenyl) | Ciba |
| Nauguard 412 | Antioxidant and Long Term Heat Stabilizer | Nauguard 412 | Thio Ester | Chemtura |
| Phosphorous Acid | Trans-esterification inhibitor | Phosphorous Acid | $H_3PO_3$ | Rhodia |
| Cyphos 104 | Flow Enhancer | Cyphos 104 | Tetradecyl (trihexyl) phosphonium (bis 2,4,4-trimethylpentyl) phosphinate | Cytec |
| Cyphos 111 | Flow Enhancer | Cyphos 111 | Phosphonium Salts-trihexyl (tetradecyl) phosphonium tetrafluoroborate | Cytec |
| Cyphos 101 | Flow Enhancer | Cyphos 101 | Phosphonium Salts-trihexyl (tetradecyl) phosphonium chloride | Cytec |
| Cyphos 103 | Flow Enhancer | Cyphos 103 | Phosphonium Salts-trihexyl (tetradecyl) phosphonium decanoate | Cytec |
| Core Shell IM | Impact Modifier/ Compatibilizer | Lotader AX8900 | Acrylic Ester Grafted Glycidyl Methacrylate | Arkema |

Table 2 shows the formulations and processing conditions. The pellets were subsequently injection molded into the various required test specimens on a Nissei injection molding machine operating above the melting point of the blend. Table 3 shows the test results of various ASTM test methods.

TABLE 2

Recipes and Preparation

| Ingredient Name | Comp. A (Wt. %) | 1 (Wt. %) | 2 (Wt. %) | 3 (Wt. %) | 4 | 5 | 6 | 7 | 8 |
|---|---|---|---|---|---|---|---|---|---|
| Polycarbonate | 58.8661 | 58.6989 | 57.7992 | 58.8661 | 58.8996 | 58.8327 | 58.8996 | 58.8327 | 58.6989 |
| PBT | 29.2089 | 29.1261 | 29.1758 | 29.2089 | 29.2254 | 29.1923 | 29.2254 | 29.1923 | 29.1261 |
| Acrylic Core Shell IM | 5 | 5 | 5 | 5 | 5 | 5 | 5 | 5 | 5 |
| Ultranox 641 | 0.225 | 0.225 | 0.225 | 0.225 | 0.225 | 0.225 | 0.225 | 0.225 | 0.225 |
| Irganox 1010 | 0.2 | 0.2 | 0.2 | 0.2 | 0.2 | 0.2 | 0.2 | 0.2 | 0.2 |
| Nauguard 412 | 0.2 | 0.2 | 0.2 | 0.2 | 0.2 | 0.2 | 0.2 | 0.2 | 0.2 |

TABLE 2-continued

| Recipes and Preparation | | | | | | | | | |
|---|---|---|---|---|---|---|---|---|---|
| Phosphorous Acid | 0.1 | 0.1 | 0.1 | 0.0 | 0.0 | 0.1 | 0.0 | 0.1 | 0.1 |
| Cyphos 104 | 0.0 | 0.25 | 0.1 | 0.1 | 0.0 | 0.0 | 0.0 | 0.0 | 0.0 |
| Cyphos 111 | 0.0 | 0.0 | 0.0 | 0.0 | 0.05 | 0.05 | 0.0 | 0.0 | 0.0 |
| Cyphos 101 | 0.0 | 0.0 | 0.0 | 0.0 | 0.0 | 0.0 | 0.05 | 0.05 | 0.0 |
| Cyphos 103 | 0.0 | 0.0 | 0.0 | 0.0 | 0.0 | 0.0 | 0.0 | 0.0 | 0.25 |
| Lotader AX8900 | 6.2 | 6.2 | 6.2 | 6.2 | 6.2 | 6.2 | 6.2 | 6.2 | 6.2 |

| | |
|---|---|
| Mixing Equipment | 16 mm Prism co-rotating twin screw extruder made by Thermo Electron Corporation of Stone, U.K. |
| Mixing Temp. | 220-255° C., 9 zone ramp |
| Order of Addition of Ingredients | Combine Phosphorus Acid and PBT, then agitate, then add all other ingredients, then feed at throat of extruder. |
| Form of Product After Mixing | Pelletized Strands |

TABLE 3

| Test Results | | | | | | | | | |
|---|---|---|---|---|---|---|---|---|---|
| Test Method | Comp. A | 1 | 2 | 3 | 4 | 5 | 6 | 7 | 8 |
| Notched Izod Impact (ASTM D-256) (ftlb/in) | 13.3 | 16.8 | 2.8 | 16 | 20.6 | 14.7 | 21.9 | 14.4 | 15.5 |
| Flexural Modulus (ASTM D790-03) Procedure B (KSI) | 298 | 322 | 324 | 326 | 314 | 313 | 313 | 314 | 322 |
| Tensile Modulus (ASTM D638-02 Type 1) (KSI) | 261 | 299 | 286 | 288 | 280 | 281 | 285 | 281 | 297 |
| Tensile Strength @ Break (ASTM D638-02 Type 1) (PSI) | 5,760 | 5,360 | 5,582 | 5,673 | 7,172 | 5,874 | 7,618 | 5,638 | 5000 |
| Tensile Elongation @ Break (ASTM D638-02 Type 1) (%) | 97 | 36 | 31 | 42 | 160 | 73 | 160 | 71 | 26 |
| Melt Flow Index (ASTM D1238) (g/10 min) | 21 | 71.7 | 52.4 | 58.4 | 21.5 | 33.1 | 20.2 | 31.6 | 78.2 |
| Heat Deflection Temperature (ASTM D648) 66 psi/0.46 MPa | 83 | 81.7 | — | — | 86 | 90.85 | 83.4 | 83.6 | 80.6 |
| Heat Deflection Temperature (ASTM D648) 264 psi/1.8 MPa | 74 | 72.7 | — | — | 76 | 73.3 | 73.2 | 73 | 72.8 |

Comparing Comparative Example A with Examples 1-3, while some of the physical properties were comparable in value, others showed a decline in performance, particularly tensile elongation and notched Izod (in the case of Example 2 only.) However, the mere addition of 1 weight percent of phosphonium phosphinate more than doubled melt flow. Coupled with the notched Izod result, Example 3 showed the best comparative physical properties with greatly enhanced melt flow, if tensile elongation is not material to the use of the final extruded article. Examples 5, 7, and 8 also show improved melt flow relative to Comparative Example A, demonstrating efficacy of other phosphonium salts as flow enhancers for blends of the present invention.

Samples of the formulations of Example 2 and Example 3 were also subjected to Differential Scanning Calorimetry (DSC) analysis. The samples were analyzed by DSC using a TA Instruments model DSC 2920. The samples were exposed to a heat-cool-heat cycle in each analysis. The first heating scan contained thermal events reflecting thermal/processing history. The controlled cooling provided an established thermal history and allowed determinations of the transitions based on material properties in the second heating scan. The temperature range of each segment was from 25° C. to 300° C. at heating/cooling rates of 10° C./minute. A nitrogen gas purge of 50 ml/minute was used. The quantitative results were determined from the data recorded in the each heating/cooling segment.

Almost no difference was observed in the DSC between samples of the two Examples 2 and 3. Example 2 had a slightly lower peak crystallization temperature (165° C. vs. 166° C.) and a slightly broader crystallization peak. The glass transition (Tg) for both Examples was 122° C., which was lower than typical PC/PBT materials (~130° C.). These data show that phosphonium phosphinate also serves as a transesterification inhibitor.

The invention is not limited to the above embodiments. The claims follow.

What is claimed is:
1. A thermoplastic polymer blend, comprising:
 (a) a polyester,
 (b) a polycarbonate, and
 (c) trihexyl(tetradecyl)phosphonium bis 2,4,4-trimethylpentylphosphinate in an amount from about 0.1 to about 4 weight percent of the blend.
2. The blend of claim 1, further comprising at least one impact modifier.
3. The blend of claim 1, wherein the polyesters comprise polyethylene terephthalate (PET), polypropylene terephthalate (PPT), polybutylene terephthalate (PBT), poly(ethylene-2,6-napthalate) (PEN), polypropylene napthalate (PPN), poly

(1,4-cyclohexanedimethanol terephthalate) (PCT), polyethylene naphthalate dibenzoate (PENDB) copolymers, or polybutylene naphthalate (PBN).

4. The blend of claim 1, further comprising optional additives selected from the group consisting of slip agents, antiblocking agents, antioxidants, ultraviolet light stabilizers, quenchers, dyes and pigments, plasticizers, mold release agents, lubricants, antistatic agents, fire retardants, fillers, and combinations thereof.

5. The blend of claim 4, wherein the fillers comprise glass fibers, talc, chalk, or clay.

6. The blend of claim 5, wherein the clay is a nanoclay.

7. The blend of claim 1, wherein the flow enhancer comprises from about 0.05 to about 1.5 weight percent of the blend.

8. An article made from the blend of claim 1.

9. The article of claim 8, wherein the blend further comprises at least one impact modifier.

10. The article of claim 8, wherein the blend further comprises optional additives selected from the group consisting of slip agents, antiblocking agents, antioxidants, ultraviolet light stabilizers, quenchers, dyes and pigments, plasticizers, mold release agents, lubricants, antistatic agents, fire retardants, fillers, and combinations thereof.

11. The article of claim 9, wherein the blend further comprises optional additives selected from the group consisting of slip agents, antiblocking agents, antioxidants, ultraviolet light stabilizers, quenchers, dyes and pigments, plasticizers, mold release agents, lubricants, antistatic agents, fire retardants, fillers, and combinations thereof.

12. The article of claim 9, wherein the polyesters comprise polyethylene terephthalate (PET), polypropylene terephthalate (PPT), polybutylene terephthalate (PBT), poly(ethylene-2,6-napthalate) (PEN), polypropylene napthalate (PPN), poly (1,4-cyclohexanedimethanol terephthalate) (PCT), polyethylene naphthalate dibenzoate (PENDB) copolymers, or polybutylene naphthalate (PBN).

13. The blend of claim 2, wherein the polyesters comprise polyethylene terephthalate (PET), polypropylene terephthalate (PPT), polybutylene terephthalate (PBT), poly(ethylene-2,6-napthalate) (PEN), polypropylene napthalate (PPN), poly (1,4-cyclohexanedimethanol terephthalate) (PCT), polyethylene naphthalate dibenzoate (PENDB) copolymers, or polybutylene naphthalate (PBN).

14. The blend of claim 2, further comprising optional additives selected from the group consisting of slip agents, antiblocking agents, antioxidants, ultraviolet light stabilizers, quenchers, dyes and pigments, plasticizers, mold release agents, lubricants, antistatic agents, fire retardants, fillers, and combinations thereof.

15. The blend of claim 14, wherein the fillers comprise glass fibers, talc, chalk, or clay.

16. The blend of claim 15, wherein the clay is a nanoclay.

* * * * *